Dec. 29, 1942.  D. M. LIGHT  2,306,398
SPRING GROUP
Filed Aug. 14, 1941  2 Sheets-Sheet 1

INVENTOR.
David M. Light,
BY

Dec. 29, 1942.  D. M. LIGHT  2,306,398
SPRING GROUP
Filed Aug. 14, 1941  2 Sheets-Sheet 2
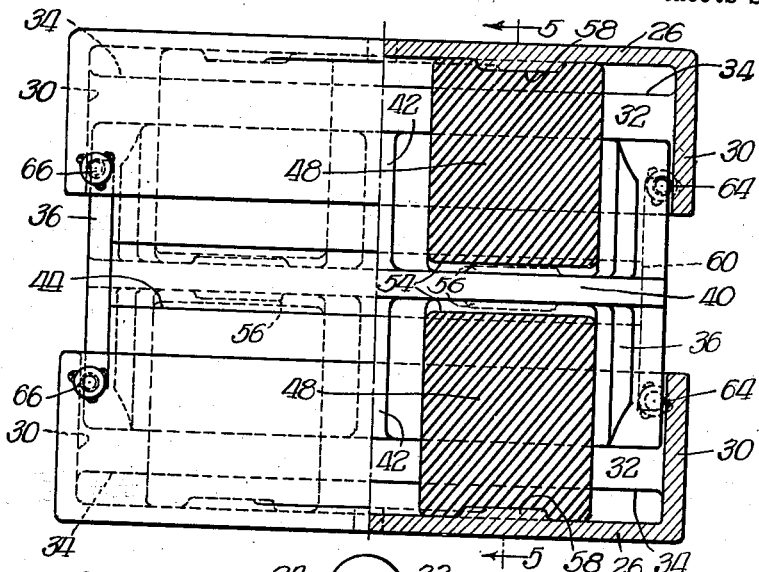
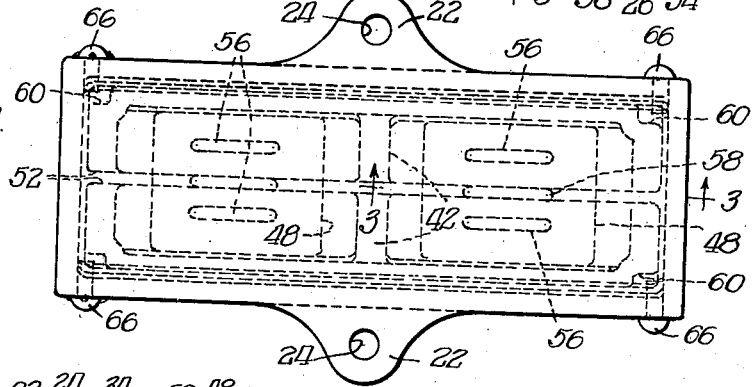
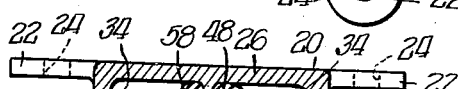
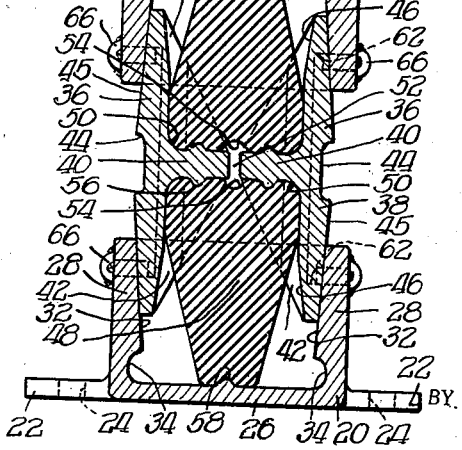
INVENTOR.
David M Light Patented Dec. 29, 1942

2,306,398

UNITED STATES PATENT OFFICE 2,306,398

SPRING GROUP

David M. Light, Chicago, Ill., assignor to American Steel Foundries, Chicago, Ill., a corporation of New Jersey Application August 14, 1941, Serial No. 406,919

25 Claims. (Cl. 267—9)

My invention relates to a spring group for a railway car truck and especially to such group of a type wherein coil springs are associated with a snubbing device, sometimes designated ride control means when so used.

The general object of my invention is to devise a form of spring group which will be eminently suitable for application to railway cars and particularly freight cars, such an arrangement requiring a reasonable amount of flexibility in order to accommodate different load requirements.

My invention comprehends an arrangement wherein coil springs are secured between top and bottom spring plates and a friction device is associated with the springs and normally comprises top and bottom followers fixed to said plates respectively and having friction shoes engaging the followers with resilient means housed within the friction device for urging the shoes into engagement with the friction surfaces of the followers.

In my novel arrangement I have provided relatively large and simple friction surfaces on each housing and complementary friction faces on each shoe so arranged that each shoe has engagement with both followers along large friction areas.

In my invention the friction shoes may be spaced apart by solid blocks of resilient material, preferably some form of rubber composition, so arranged that as the followers approach each other the friction developed will constantly increase and reach a maximum at the end of the stroke. When the end of the stroke is reached the pads of resilient material will substantially fill the cavities of the followers, thus offering said maximum resistance.

In my novel arrangement top and bottom followers are identical, as are likewise the opposed friction shoes, so that only two patterns may be required for production of the metal parts, and the resilient pads are identical in form.

In the drawings, Figure 1 is a top plan view of a spring group embodying my invention, and Figure 2 is a side elevation thereof.

Figure 3 is a side elevation, half in section, of my novel form of friction device, the section being taken substantially in the longitudinal vertical plane bisecting the snubber and as indicated by the line 3—3 of Figure 4.

Figure 4 is a top plan view of my novel form of snubbing device, and Figure 5 is a sectional view therethrough, the section being taken substantially in the transverse vertical plane indicated by the line 5—5 of Figure 3.

Figure 1:
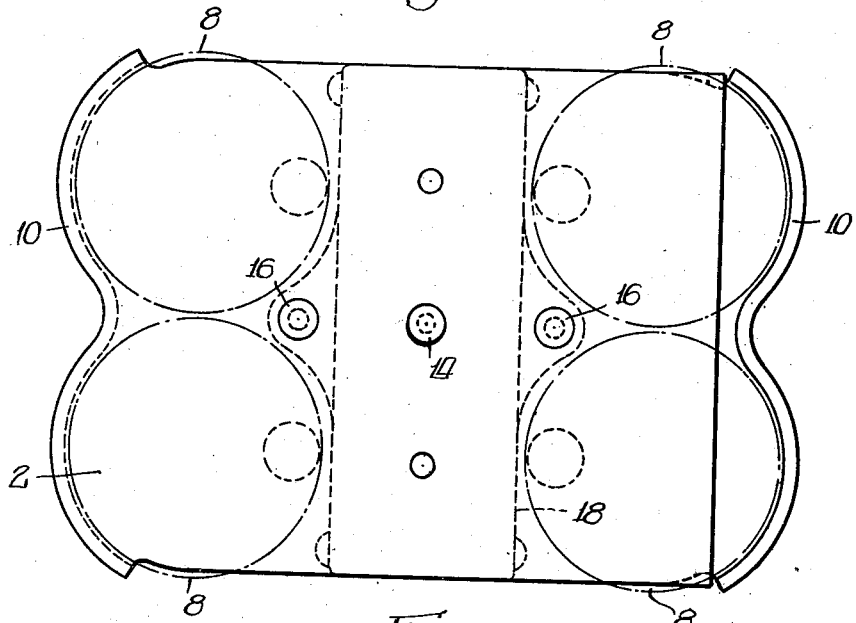
Figure 2:
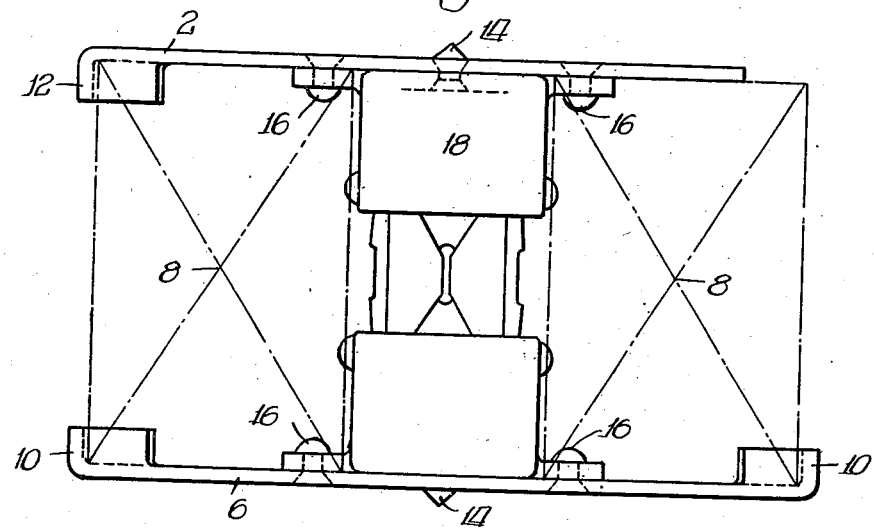

Describing the structure in detail, it will be noted that my novel arrangement comprises the usual top spring plate 2 cut off at its inboard edge to afford maximum clearance for the superposed bolster or the load carrying member (not shown) and a bottom spring plate 6 between which may be confined a plurality of coil springs diagrammatically indicated at 8, 8, one of said coil springs being positioned adjacent each corner of the group. The bottom spring plate is afforded inturned flanges 10, 10 at both inboard and outboard edges, said flanges having a scalloped outline, thus conforming to the contour of the confined coil springs. The top spring plate is afforded a similar inturned flange 12 at its outboard edge and each plate has centrally formed thereon a positioning lug 14 which may conveniently be formed as portions of certain of the rivets 16, 16 which are the means of securing the followers of the friction device, generally designated 18, to the respective spring plates.

The friction device is shown in detail in Figures 3, 4, and 5 and comprises identical top and bottom followers 20, 20 with centrally formed ears 22, 22 projecting at opposite sides thereof and perforated at 24, 24 for reception of the before-mentioned securing rivets, each of said followers taking the form of a rectangular box-like structure with a base wall 26, opposed friction side walls 28, 28 and end walls 30, 30. Each of said side walls is formed with a flat tapering friction surface 32, the surfaces 32, 32 on the upper follower extending from the upper edge of each side wall downwardly and outwardly to adjacent the lower edge thereof, and the surfaces 32, 32 on the bottom follower extending from the upper edge of each side wall downwardly and inwardly to adjacent the lower edge of said wall, and a relieved portion 34 is afforded in the form of a longitudinal slot at the base of each side wall in order to permit the friction surface on the cooperating friction shoe to traverse the entire area of the friction surface on the follower without the formation of shoulders therealong. In frictional engagement with the followers at opposite sides of the device are the friction shoes 36, 36 of identical form, each of said shoes comprising a plate-like base or friction wall generally designated 38 and a reinforcing horizontal longitudinal flange 40, said flange extending for the length of the shoe, and said shoe being further reinforced by transverse vertical ribs 42, 42 formed centrally thereof. Each friction wall 38 is relieved as at 44 by a longitudinal slot of convenient width serving to reduce the weight of the shoe and to form a convenient section for satisfactory foundry practice in the production thereof as well as spacing the friction surfaces 45, 45 at the top and bottom of each shoe and preventing the formation of shoulders thereon. On its inner face each shoe is formed with a smooth surface along the back of the wall 38 tapering somewhat as at 46 along the top and bottom edges in order to afford convenient flow of the resilient pad 48, each end of which is confined between the friction shoes at the top and bottom of the device. Each friction shoe is formed with smooth radii as at 50, 50 along the merging edges of the flange 40 with the adjacent side wall 38 in order to prevent abrasion of the adjacent confined resilient pad. The flanges 40, 40 of the opposite friction shoes are afforded a degree of clearance therebetween when the device is expanded, as shown at 52 in the sectional view of Figure 5, in order to permit said shoes to approach each other as the device is compressed. Each resilient pad 48 has a longitudinal central slot 54 likewise affording clearance for said pad from the adjacent edges of the flanges 40, 40 so that when said resilient pads are compressed there will be no interference between the edges of the shoes and the resilient material as it is distorted. Positioning means for the resilient pads are afforded on the top and bottom surfaces of each horizontal flange 40 as indicated at 56, 56, said positioning means being in the form of ribs or elongated lugs, each of which may be received in a complementary slot formed on the abutting surface of the adjacent resilient pad 48. By this means each pad 48 is positioned with respect to the shoes between which it is confined, and the opposite face of each pad 48 is similarly positioned as at 58 with respect to the base wall 26 of the adjacent follower. At each end of each friction shoe is formed a vertical channel 60 defined by shoulders 62, 62 at the top and bottom edges of the shoe, and within each channel or slot 60 may be received the projecting end of the associated lugs 64, 64 fixed on the side walls of the opposite followers, said lugs 64, 64 being afforded slidable cooperation in the slot 60 of the associated shoes and limiting the opening movement of the device by having abutment against the before-mentioned shoulders 62, 62. Each lug 64, as shown, is formed as the extremity of a rivet 66 which may extend through the side wall of the follower and be fixed therein as by welding, thus serving as means of retaining the device in assembly after the parts have been placed in normal relative position in the assembling operation.

In my novel arrangement the character of the resilient pad 48 may be modified to influence the amount of friction developed, or the degree of taper on the engaging friction surfaces of the shoes and followers may be altered to accomplish a similar result.

It will be apparent to those skilled in the art that I have afforded cooperating friction surfaces on the shoes and followers of maximum area and simplicity, while forming, at the same time, both followers and friction shoes in shapes eminently convenient for foundry practice. At the same time, the friction shoes may conveniently be formed as forgings if desired.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a spring group for a railway car truck, top and bottom spring plates, coil springs confined therebetween, and a friction device interposed between said coil springs with opposite followers secured to said plates respectively, said followers being of identical box-like form with each having a base wall, end walls, and side walls with flat flaring friction faces, friction shoes at opposite sides of said device with friction surfaces complementary in form to said friction faces and in engagement therewith, a plurality of resilient means at each end of the device, each of said resilient means having abutment with both of said shoes and with one of said followers, and each of said resilient means being in the form of a solid block of resilient material of column-like transverse section with the base of said column compressed between respective shoes, and the top thereof in abutment with the adjacent follower, and relieved areas on each of said blocks spacing said blocks from adjacent edges of opposite shoes.

2. In a spring group, top and bottom plates, a coil spring therebetween, and a friction device with opposite followers fixed to said plates respectively, said followers being identical in form and each having a box-like shape with a base wall, end walls, and side walls with flat flaring opposed friction surfaces, each of said side walls having a relieved portion defining an edge of the adjacent friction surface, opposite friction shoes having friction faces in engagement with said surfaces, resilient means at the top and bottom of said device, each of the resilient means being compressed between opposed friction shoes and an adjacent follower and affording a direct force path from each friction shoe to the associated follower, each of said resilient means having positioning means engaging the respective shoes, and a relieved portion affording clearance of said resilient means from the proximate edges of opposite shoes.

3. In a spring group for a railway car truck, top and bottom plates, a coil spring, and a friction device confined in parallel therebetween, said friction device comprising identical followers of rectangular form each with opposed diagonally arranged friction walls and friction shoes interlocked with said followers at opposite sides of said device, each friction shoe having diagonal face engagement in reverse directions with the respective followers, a resilient pad confined between each follower and adjacent portions of said shoes, each of said pads having a cone-like section with the base thereof compressed between the opposed friction shoes, and the top thereof in abutment with a base wall of the adjacent follower, and means on each of said pads cooperating with one of said followers and both of said shoes for positioning thereof.

4. In a spring group for a railway car truck, top and bottom spring plates, coil springs confined therebetween, and a friction device interposed between said coil springs with opposite followers secured to said plates respectively, said followers being of identical box-like form, each with a base wall, end walls, and side walls with flat flaring friction faces, friction shoes at opposite sides of said device with friction surfaces complementary in form to said friction faces and in engagement therewith, and a plurality of resilient means at each end of the device, each of said resilient means having abutment with both of said shoes and with one of said followers, and each of said resilient means being in the form of a block of resilient material of column-like transverse section with the base of said column compressed between respective shoes, and the top thereof in abutment with the adjacent follower.

5. In a spring group, top and bottom plates, a coil spring therebetween, and a friction device with opposite followers fixed to said plates respectively, said followers being identical in form and each having a box-like shape with a base wall, end walls, and side walls with flat flaring opposed friction surfaces, each of said side walls having a relieved portion defining an edge of the adjacent friction surface, opposite friction shoes having friction faces in engagement with said surfaces, resilient means at the top and bottom of said device, each of the resilient means being compressed between opposed friction shoes and an adjacent follower and affording a direct force path from each friction shoe to said adjacent follower, and relieved portions centrally formed on said friction shoes spacing the friction faces in engagement with respective followers.

6. In a ride control device for a railway car truck, a spring group comprising top and bottom spring plates, coil springs confined therebetween at opposite ends of the device, and a snubber confined between said plates and interposed between said coil springs, said snubber comprising identical followers of rectangular box-like form, each having opposed tapering friction surfaces, friction shoes at opposite sides of said snubber, each having a friction face in engagement with each follower, a plurality of resilient pads confined between each follower and adjacent portions of both shoes, each of said pads having a longitudinal channel affording relief of said pad adjacent the oppositely disposed edges of said shoes to afford clearance therefrom, and positioning means on one of said followers and on both of said shoes for each of said pads.

7. In a spring group for a railway car truck, top and bottom plates, a coil spring, and a friction device confined in parallel therebetween, said friction device comprising identical followers of rectangular form each with opposed diagonally arranged friction walls and friction shoes interlocked with said followers at opposite sides of said device, each friction shoe having diagonal face engagement in reverse directions with the respective followers, and a resilient pad confined between each follower and adjacent portions of said shoes, each of said pads having a cone-like section with the base thereof compressed between the opposed friction shoes, and the top thereof in abutment with a base wall of the adjacent follower.

8. In a ride control device for a railway car truck, a spring group comprising top and bottom spring plates, coil springs confined therebetween at opposite ends of the device, and a snubber confined between said plates and interposed between said coil springs, said snubber comprising identical followers of rectangular box-like form, each having opposed tapering friction surfaces, friction shoes at opposite sides of said snubber, each having a friction face in engagement with each follower, and a plurality of resilient pads confined between each follower and adjacent portions of both shoes, each of said pads having a longitudinal channel affording relief of said pad adjacent the opposite edges of said shoes and providing clearance therefrom.

9. In a spring group, top and bottom plates, a coil spring therebetween, and a friction device with opposite followers fixed to said plates respectively, said followers being identical in form and each having a box-like shape with a base wall, end walls, and side walls with flat flaring opposed friction surfaces, each of said side walls having a relieved portion defining an edge of the adjacent friction surface, opposite friction shoes having friction faces in engagement with said surfaces, and resilient means at the top and bottom of said device, each of the resilient means being compressed between opposed friction shoes and an adjacent follower and affording a direct force path from each friction shoe to said adjacent follower.

10. In a ride control device for a railway car truck, a spring group comprising top and bottom spring plates, coil springs confined therebetween at opposite ends of the device, and a snubber confined between said plates and interposed between said coil springs, said snubber comprising identical followers of rectangular box-like form, each having opposed tapering friction surfaces, friction shoes at opposite sides of said snubber, each having a friction face in engagement with each follower, a plurality of resilient pads confined between each follower and adjacent portions of both shoes, and interengaging means on said followers and shoes limiting relative movement therebetween.

11. In a spring group for a railway car truck, top and bottom spring plates, coil springs confined therebetween, and a friction device interposed between said coil springs with opposite followers secured to said plates respectively, said followers being of identical box-like form each having a base wall, end walls, and side walls with flat flaring friction faces, friction shoes at opposite sides of said device with friction surfaces complementary in form to said friction faces and in engagement therewith, and a plurality of resilient means at each end of the device, each of said friction means having abutment with both of said shoes and with one of said followers.

12. In a spring group, a coil spring, and a friction device confined in parallel between opposed plates, said friction device comprising top and bottom followers, friction shoes each engaging both followers, spaced resilient means at the top of said device confined between said top follower and both of said shoes, and spaced resilient means at the bottom of said device confined between said bottom followers and both of said shoes, the respective resilient means at the top and bottom of the device being disposed in opposition to each other, and each of said resilient means affording a direct force path from the associated follower to both of said shoes.

13. In a spring group, a coil spring, and a friction device confined in parallel between opposed plates, said friction device comprising top and bottom followers, friction shoes each engaging both followers, spaced resilient means at the top of said device confined between said top follower and both of said shoes, and spaced resilient means at the bottom of said device confined between said bottom follower and both of said shoes, each of said resilient means affording a direct force path from the associated follower to both of said shoes and a direct force path between opposed shoes.

14. In a spring group, a top spring plate, a bottom spring plate, a coil spring, and a friction device confined in parallel between said plates, said friction device having identical top and bottom followers each with opposed tapering friction surfaces, friction shoes at opposite sides of the device with friction faces engaging respective followers, and top and bottom resilient members each confined between opposed shoes and an adjacent follower, each of said resilient members affording a direct force path from one of said followers to both of said friction shoes, and the respective top and bottom resilient elements being positioned in opposition to each other.

15. In a spring group for a railway car truck, top and bottom plates, a coil spring, and a friction device confined in parallel therebetween, said friction device comprising identical followers of rectangular form each with opposed diagonally arranged friction walls and friction shoes interlocked with said followers at opposite sides of said device, each friction shoe having diagonal face engagement in reverse directions with the respective followers, and a resilient pad confined between each follower and adjacent portions of said shoes.

16. In a ride control device for a railway car truck, a spring group comprising top and bottom spring plates, coil springs confined therebetween at opposite ends of the device, and a snubber confined between said plates and interposed between said coil springs, said snubber comprising identical followers of rectangular box-like form, each having opposed tapering friction surfaces, friction shoes at opposite sides of said snubber, each having a friction face in engagement with each follower, and a plurality of resilient pads confined between each follower and adjacent portions of both shoes.

17. In a spring group, a top spring plate, a bottom spring plate, a coil spring, and a friction device confined in parallel between said plates, said friction device having identical top and bottom followers each with opposed tapering friction surfaces, friction shoes at opposite sides of the device with friction faces engaging respective followers, and top and bottom resilient members, each confined between opposed shoes and an adjacent follower, each of said resilient members affording a direct force path from one friction shoe to the other and to one of said followers.

18. In a spring group, a top spring plate, a bottom spring plate, a coil spring, and a friction device confined in parallel between said plates, said friction device having identical top and bottom followers each with opposed tapering friction surfaces, friction shoes at opposite sides of the device with friction faces engaging respective followers, and top and bottom resilient members each confined between opposed shoes and an adjacent follower, each of said resilient members affording a direct force path from one of said followers to both of said friction shoes.

19. In a spring group, a coil spring, and a friction device confined in parallel between opposed plates, said friction device comprising top and bottom followers, friction shoes each engaging both followers, spaced resilient means at the top of said device confined between said top follower and both of said shoes, and spaced resilient means at the bottom of said device confined between said bottom follower and both of said shoes, the respective resilient means at the top and bottom of the device being disposed in opposition to each other.

20. In a spring group, top and bottom plates, a coil spring, and a friction device in parallel therebetween, said device having opposed followers fixed to said plates and friction shoes each in engagement with both of said followers, and resilient means at the top and bottom of said device in opposition to each other, each of said resilient means affording a direct force path from each friction shoe to an adjacent follower and likewise affording a direct force path to the opposed friction shoe.

21. In a spring group, top and bottom spring plates, an interposed spring, top and bottom followers secured to respective plates, each follower comprising opposed friction surfaces, friction shoes engaging respective surfaces, and spaced resilient means, each of said resilient means being confined between said shoes and an adjacent follower only and affording a direct force path from said follower to both shoes.

22. In a friction device, top and bottom followers each comprising opposed friction surfaces, friction shoes engaging respective surfaces, and spaced resilient means each confined between said shoes and an adjacent follower only and affording a direct force path from said follower to both shoes.

23. In a friction absorbing device, spaced resilient members, and a plurality of sets of interlocked friction elements abutting said resilient members and urged thereby into frictional engagement with each other, each of said resilient members affording direct force paths between one element only of one set and a plurality of elements of another set.

24. In a friction absorbing device, upper and lower followers, shoes frictionally engaging said followers, and spaced expansible resilient elements each compressed by and between said shoes and one follower and spaced from the other follower.

25. In a frictional device, follower members and wedge members having complementary friction surfaces in abutment with each other, and resilient elements spaced by certain of said members and each compressed by and between said wedge members and one follower member only in normal position and further compressible therebetween as said device is compacted under load.

DAVID M. LIGHT.